(12) United States Patent
Panosian

(10) Patent No.: US 11,193,763 B1
(45) Date of Patent: Dec. 7, 2021

(54) EXTENDIBLE LEVEL WITH NON-COPLANAR EXTENSION SURFACE

(71) Applicant: Michael H. Panosian, Irvine, CA (US)

(72) Inventor: Michael H. Panosian, Irvine, CA (US)

( * ) Notice: Subject to any disclaimer, the term of this patent is extended or adjusted under 35 U.S.C. 154(b) by 0 days.

(21) Appl. No.: 17/200,960

(22) Filed: Mar. 15, 2021

(51) Int. Cl.
*G01C 9/02* (2006.01)
*G01C 9/34* (2006.01)

(52) U.S. Cl.
CPC ......... *G01C 9/02* (2013.01); *G01C 9/34* (2013.01)

(58) Field of Classification Search
CPC .................................. G01C 9/02; G01C 9/34
See application file for complete search history.

(56) References Cited

U.S. PATENT DOCUMENTS

| | | | | | |
|---|---|---|---|---|---|
| 4,130,943 | A | * | 12/1978 | Talbot | G01C 9/28 33/374 |
| 4,607,437 | A | * | 8/1986 | McSorley, Sr. | G01C 9/28 33/374 |
| 4,928,395 | A | * | 5/1990 | Good | G01C 9/24 33/374 |
| 5,249,365 | A | * | 10/1993 | Santiago | G01C 9/28 33/374 |
| 5,433,011 | A | * | 7/1995 | Scarborough | G01C 9/28 33/374 |
| 5,709,034 | A | * | 1/1998 | Kohner | G01C 9/28 33/365 |
| 6,041,510 | A | * | 3/2000 | Huff | G01B 3/02 33/374 |
| 6,047,478 | A | * | 4/2000 | Sowers | G01C 9/26 33/374 |
| 6,637,120 | B2 | * | 10/2003 | Pustay | G01C 9/28 33/374 |
| 7,073,270 | B2 | * | 7/2006 | Kim | G01C 9/28 33/365 |
| 7,530,175 | B2 | * | 5/2009 | Strutt | G01C 9/28 33/374 |
| 7,770,298 | B1 | * | 8/2010 | Wojciechowski | G01C 9/26 33/365 |
| 7,866,055 | B2 | * | 1/2011 | Zhang | G01C 9/26 33/365 |
| 8,109,005 | B2 | * | 2/2012 | Hudson | G01C 9/18 33/377 |
| 8,925,212 | B2 | * | 1/2015 | Allemand | G01C 9/32 33/348.2 |
| 9,970,760 | B2 | * | 5/2018 | Wojciechowski | G01C 9/02 |
| 10,281,274 | B2 | * | 5/2019 | Block | B43L 7/00 |
| 10,436,584 | B2 | * | 10/2019 | Gray | G01C 9/26 |
| 10,458,791 | B2 | * | 10/2019 | Guma | G01C 9/26 |
| 10,697,770 | B2 | * | 6/2020 | Neitzell | G01C 9/28 |

(Continued)

*Primary Examiner* — Nimeshkumar D Patel
*Assistant Examiner* — Tania Courson
(74) *Attorney, Agent, or Firm* — Arjomand Law Group; Farjam Majd

(57) ABSTRACT

A level apparatus is disclosed including a body with a slide channel, a slider coupled with the body via the slide channel to slide parallel with respect to the body to extend a length of the level apparatus, a planar base surface on a side of the body to allow the level apparatus to rest on a work surface the orientation of which is to be measured, and a non-coplanar contact member at an endcap of the slider to rest on the work surface when the slider is in an extended position, wherein a tip of the non-coplanar contact member resting on the work surface is coplanar with the planar base surface.

20 Claims, 8 Drawing Sheets

(56) References Cited

U.S. PATENT DOCUMENTS

| | | | |
|---|---|---|---|
| 10,845,193 B2 * | 11/2020 | Doyle | G01C 9/02 |
| 10,955,240 B2 * | 3/2021 | Dorscheid | G01C 9/28 |
| 2005/0223577 A1 * | 10/2005 | Scarborough | G01C 9/28 33/379 |
| 2013/0326895 A1 * | 12/2013 | Bureau | G01C 9/26 33/381 |
| 2018/0172443 A1 * | 6/2018 | Doyle | G01C 9/02 |
| 2020/0018597 A1 * | 1/2020 | Tang | G01C 9/26 |

\* cited by examiner

EXTENDIBLE LEVEL WITH NON-COPLANAR EXTENSION SURFACE

TECHNICAL FIELD

This application relates generally to a level device used for measuring orientation of a surface. More specifically, this application relates to a method and apparatus for measuring orientation of surfaces longer than the level device.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
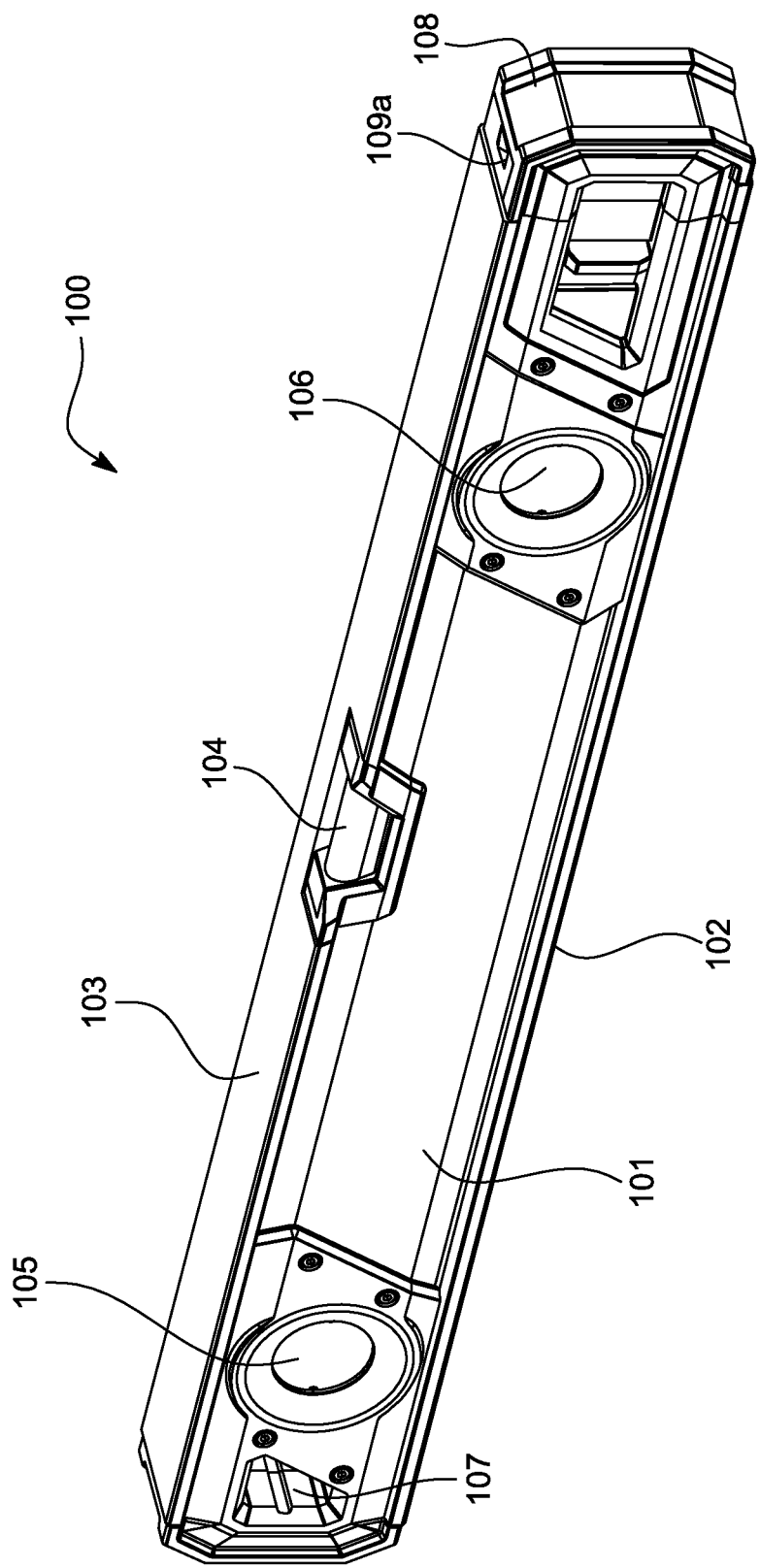
FIG. 1 shows an example level apparatus used for measuring orientation of a work surface.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references an extending level apparatus in an I-beam configuration, it will be appreciated that the disclosure may be used with any kind of orientation measuring apparatus including a non-I-beam level configuration, such as box structures.

Briefly described, a method and an apparatus are disclosed to measure the orientation of a work surface. This disclosure details a level apparatus having a body, a slider, and one or more orientation measuring device such as a spirit bubble vial. The slider is coupled with the body by fitting within a slide channel of the body. By sliding the slider in and out between a fully contracted state (shortest working length of the level apparatus) and a fully extended state (longest working length of the level apparatus), or at any distance between these two states, the length of the level apparatus can be changed to accommodate a work surface, to be orientation-measured, that is longer than the length of the level when in the fully contracted state. The body includes a planar surface on one side that comes in contact with the work surface. A non-coplanar contact member is coupled with an endcap coupled with slider. Both the planar surface and the non-coplanar contact member rest on the work surface to be orientation-measured. The non-coplanar contact member includes a tip for resting on the work surface and this tip is coplanar with the planar surface. That is, the tip lies in the same plane as the planar surface of the level body.

The extending feature of the level apparatus is provided by having a main body for the level apparatus with a frame including a slide channel housing, a slider coupled to an endcap forming the sliding extending part of the level apparatus. The orientation measuring devices are coupled to the main body in an embodiment of this disclosure, where the non-coplanar contact point of the level apparatus is coupled to the endcap at the end of the slider.

A level apparatus is commonly used in construction business, and most often masons and framers use both a short and a long level apparatus when laying bricks, framing a structure, or other similar processes. The short level is used for controlling levelness of the individual brick laying and the longer level apparatus is used for longer surfaces, and also, when vertically used with respect to the structure, to make sure the raised structure is plumb. It is useful to have a single extendable level apparatus that in a contracted configuration can work as a short level apparatus and in an extended configuration can be used as a long level apparatus. Furthermore, the most common level apparatus resembles an I-shaped structure with the flanges used as surfaces to rest on a work surface to be orientation measured with spirit bubble vials placed in the web of the level apparatus. Usually, the work surfaces are not perfect planar surfaces with perfect surface finishes. Bumps on work surfaces may introduce error in orientation measurement of the work surface to decide if the work surface is adequately level and/or plumb. A level apparatus that provides a non-coplanar contact member at one end of the level apparatus can overcome the issue with imperfect work surface finish, by resting on the work surface and between any bumps that may be on the work surface.

In some embodiments of present disclosure, a level apparatus includes a body, a slider coupled with the body to slide parallel with respect to the body to extend a length of the level apparatus. The level apparatus further includes a planar base surface on a side of the body to allow the level apparatus to rest on a work surface the orientation of which is to be measured, and a non-coplanar contact member at an endcap of the slider to rest on the work surface when the slider is in an extended position, wherein a tip of the non-coplanar contact member is coplanar with the planar base surface.

The level apparatus further includes an orientation measuring device, wherein the orientation measuring device includes a bubble vial, a circular vial, an electronic orientation measuring device, a piezoelectric based orientation measuring device, or a combination thereof.

The non-coplanar contact member of the level apparatus includes a semi sphere, or alternatively a plurality of semi spheres coupled to the endcap about equally distanced from each other forming a matrix, and wherein the tips of the non-coplanar semi spheres are coplanar with the planar base surface.

When the endcap of the apparatus extends away from the body a length of the level apparatus increases, and with the endcap not extended away from the body the level apparatus is in a contracted configuration or state.

In some other embodiments of present disclosure an orientation measuring assembly includes an I-beam shaped body, wherein the I-beam shaped body includes a web and an upper flange forming a planar base surface of the body to rest on a work surface the orientation of which is to be measured.

The body of the orientation measuring assembly further includes a slide channel, wherein a slider is coupled with the body via the slide channel, and the slider slides parallel with respect to the body to extend a length of the level apparatus. An endcap is coupled to a free end of the slider, and a non-coplanar contact member at the endcap of the slider rests on the work surface when the slider is in an extended position, wherein a tip of the non-coplanar contact member resting on the work surface is coplanar with the planar base surface.

The orientation measuring assembly further includes an orientation measuring device, wherein the orientation measuring device comprises a bubble vial, a circular vial, an electronic orientation measuring device, a piezoelectric based orientation measuring device, or a combination thereof.

The non-coplanar contact member of the orientation measuring assembly comprise a semi sphere, alternatively the non-coplanar contact member comprise a plurality of semi spheres coupled to the endcap about equally distanced from each other forming a matrix, wherein the tips of the non-coplanar semi spheres are coplanar with the planar base surface.

The endcap of the orientation measuring assembly extends away from the body increasing a length of the orientation measuring assembly; and with the endcap not extended away from the body the orientation measuring assembly is in a contracted configuration.

In some other embodiments of present disclosure a method for using a level apparatus includes sliding a slider coupled to an endcap through a slide channel of a body of the level apparatus, extending a length of the level apparatus to accommodate a length of a work surface which is to be orientation measured. The method of use of the level apparatus further includes resting a base surface of the body on the work surface, and further resting a non-coplanar contact member coupled to the endcap on the work surface, and making the orientation measurement of the work surface using an orientation measuring device coupled to the body. The orientation measuring device of the level apparatus includes a bubble vial, a circular vial, an electronic orientation measuring device, a piezoelectric based orientation measuring device, or a combination thereof.

In the method of use of the level device, the non-coplanar contact member includes a semi sphere coupled to the endcap, and a tip of the non-coplanar semi sphere is coplanar with the base surface. Alternatively, the non-coplanar contact member includes a plurality of semi spheres coupled to the endcap, wherein the plurality of semi spheres coupled to the endcap are spaced about equal distance from each other forming a matrix pattern; and wherein the tips of the non-coplanar semi spheres are coplanar with the planar base surface.

FIG. 1 shows an example level apparatus used for measuring orientation of a work surface. The illustration shows a contracted level apparatus 100 with a body 102 in an I beam general configuration showing a web 101 and as an upper flange of the I beam a planar base surface 103 for resting on a work surface to be orientation measured. Illustration further shows an orientation measuring device of a bubble vial 104 and circular vials 105 and 106. Even though not shown in FIG. 1, other orientation measuring devices such as an electronic orientation measuring device, and/or a piezoelectric based orientation measuring device may be coupled to the level apparatus 100. The orientation measuring devices can be coupled to the level apparatus 100 via glue, press fit, screwed in, welding, or other fastening techniques. FIG. 1 further shows an aperture 107 that can be used for a hanging rope for hanging the level apparatus 100 at one end, and an end cap 108 at the other end of the level apparatus 100. Furthermore, a non-coplanar contact member 109a is shown coupled to the endcap 108.

The non-coplanar contact member 109a coupling to the endcap 108 can be accomplished in different configurations. In one configuration where the non-coplanar member 109a is initially not contiguous with the endcap 108, the two structures may be joined together using glue, press fit, screwed in, welding, or other fastening techniques. In an alternative configuration where the non-coplanar member 109a is from the beginning contiguous with the endcap 108 the non-coplanar member 109a and endcap 108 may be machined from the same block of material, where the machining may be through cutting the material, chemical etching, wire EDM (electro discharge machining), three dimensional (3D) printing of a structure including the non-coplanar member 109a and the endcap 108, injection molding including plastic injection molding, casting, stamping, or other material forming techniques.

A contracted level apparatus 100 as shown in FIG. 1 is used to measure orientation of a work surface. Alternative methods for measuring orientation of a work surface may be by using a single elongated vial containing an air bubble captured in liquid; a visual laser beam providing a straight line of light for visual comparison with the work surface; or a level apparatus 100 which is based on a box cross section structure as opposed to an I-Beam cross section structure.

In FIG. 1, the planar base surface 103 of the body 102 and the non-coplanar contact member 109a coupled to the endcap 108 are placed on the work surface, and an orientation of the work surface including its levelness and/or plumbness is then measured using the orientation measuring device bubble vial 104 and circular vials 105 and 106. An alternative method for measuring plumbness of a wall can be accomplished via visually comparing the surface of the wall with a stretched string forming a plumb line with a small weight (plumb bob or plummet) attached to a free end of the string with the other end of the string held fixed above ground. The rigidity of a level device allows smoothing uneven surfaces by the level's edge caused by, for examples, bricks that are not perfectly lined up or other debris and broken corners that make the work surface not even or smooth. This cannot be done by a plumb bob.

In various embodiments, the non-coplanar contact member 109a, may be implemented in a number configurations, including one or more conical members, one or more semi-spherical members, one or more pyramid-shaped members, one or more cylindrical members, or one or more non-coplanar contact members having any other shape that satisfies the definition of a non-coplanar surface.

Figure 2:
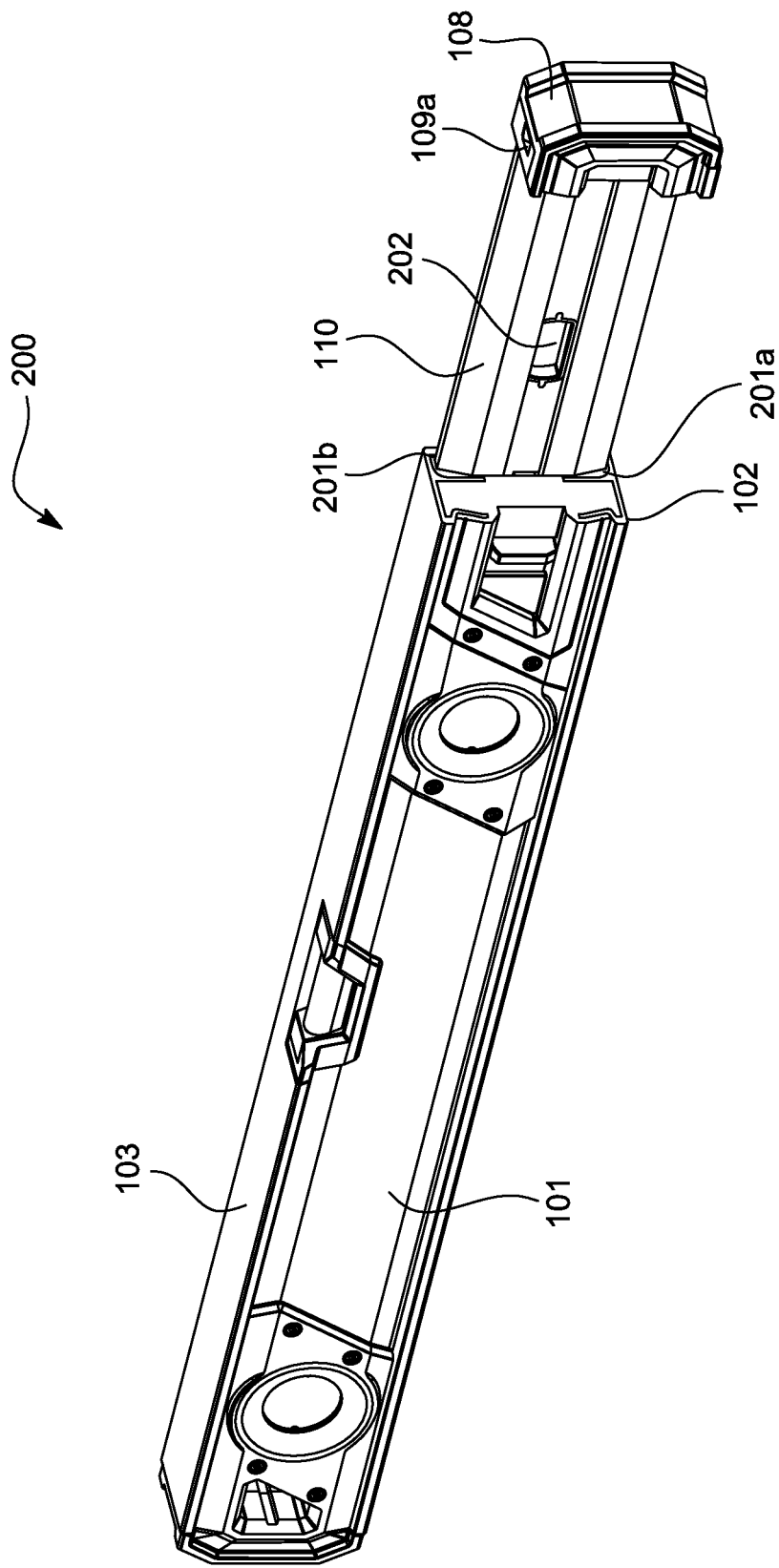
FIG. 2 shows an example front view of the extended level apparatus of FIG. 1.

FIG. 2 shows an example front view of the extended level apparatus of FIG. 1. Illustration shows a front view of the extended level apparatus 200, wherein a web 101 of the I Beam channel of the body 102 along with a base surface 103 of the body 102 are identified. Further, a slide channel 201 with a lower rail 201a and an upper rail 201b of the body 102 and a coupled slider 110 in an extended configuration is shown. The endcap 108 coupled to the slider 110 and the non-coplanar contact member 109a coupled to the endcap 108 are also illustrated. Slider 110 extends away from the body 102 by sliding through the slide channel 201, distancing the endcap 108 from the body 102 increasing the length of the level apparatus 100.

The endcap 108 coupling to the slider 110 can be accomplished in different configurations. In one configuration where the endcap 108 is initially not contiguous with the slider 110, the two structure may be joined together using glue, press fit, screwed in, welding, or other fastening techniques. In an alternative configuration where the endcap 108 is from the beginning contiguous with the slider 110 the endcap 108 and slider 110 may be machined from the same block of material, where the machining may be through cutting the material, chemical etching, wire EDM (electro discharge machining), three-dimensional 3D printing of a structure including the endcap 108 and slider 110, injection molding including plastic injection molding, casting, stamping, or other material forming techniques.

Figure 3:
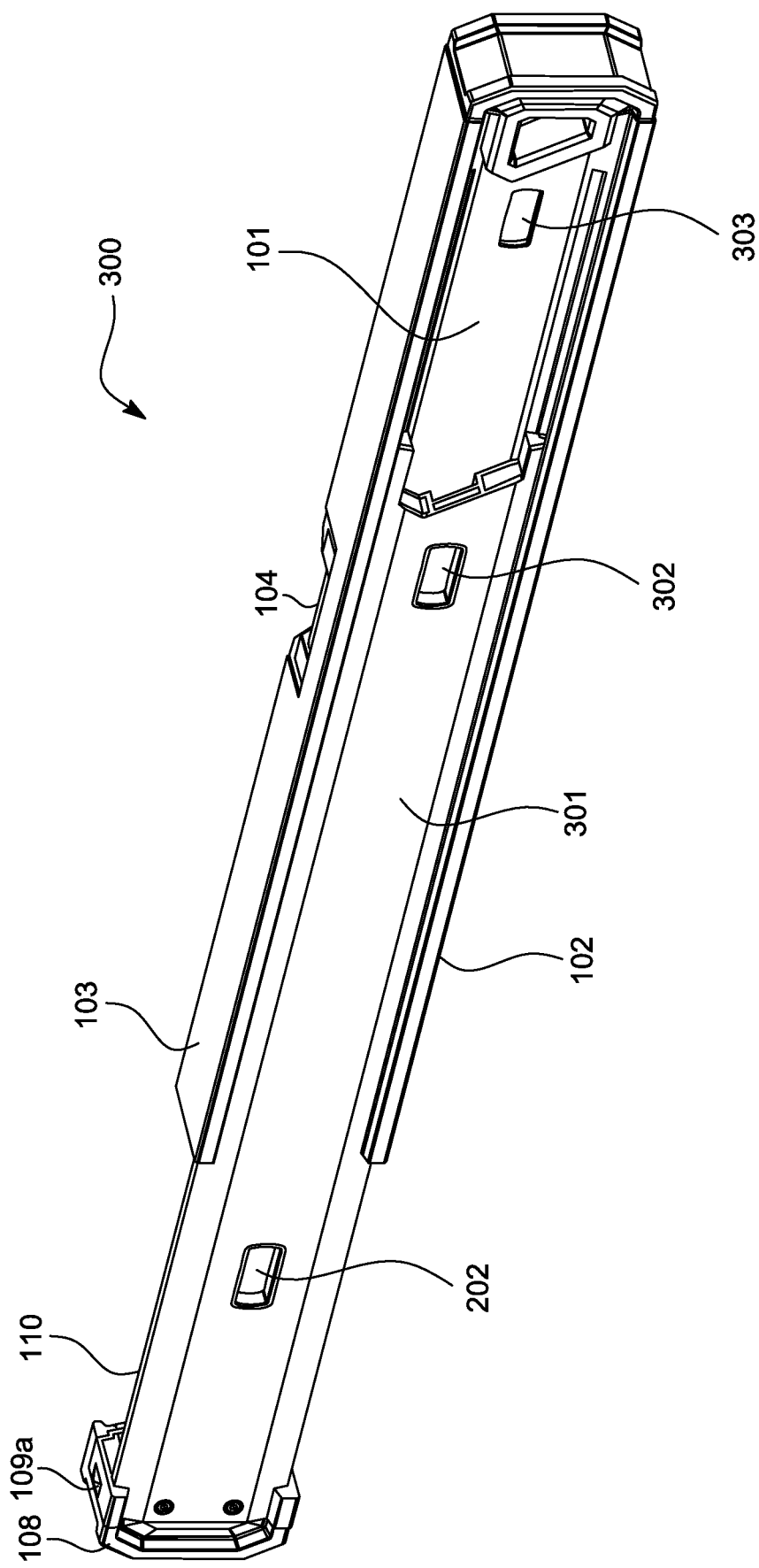
FIG. 3 shows an example back view of the extended level apparatus of FIG. 2.

FIG. 3 shows an example back view of the extended level apparatus of FIG. 2. Illustration shows a back view of an extended level apparatus 300. The body 102, base surface 103, bubble vial 104, and web 101 of the I Beam channel of the body 102 are shown, along with the slider 110, slider back view 301, endcap 108 and non-coplanar contact member 109a coupled to the endcap 108.

In FIG. 3, similar to FIG. 2 Slider 110 slides and extends away from the body 102, distancing the endcap 108 from the body 102 increasing the length of the level apparatus 100.

Figure 4:
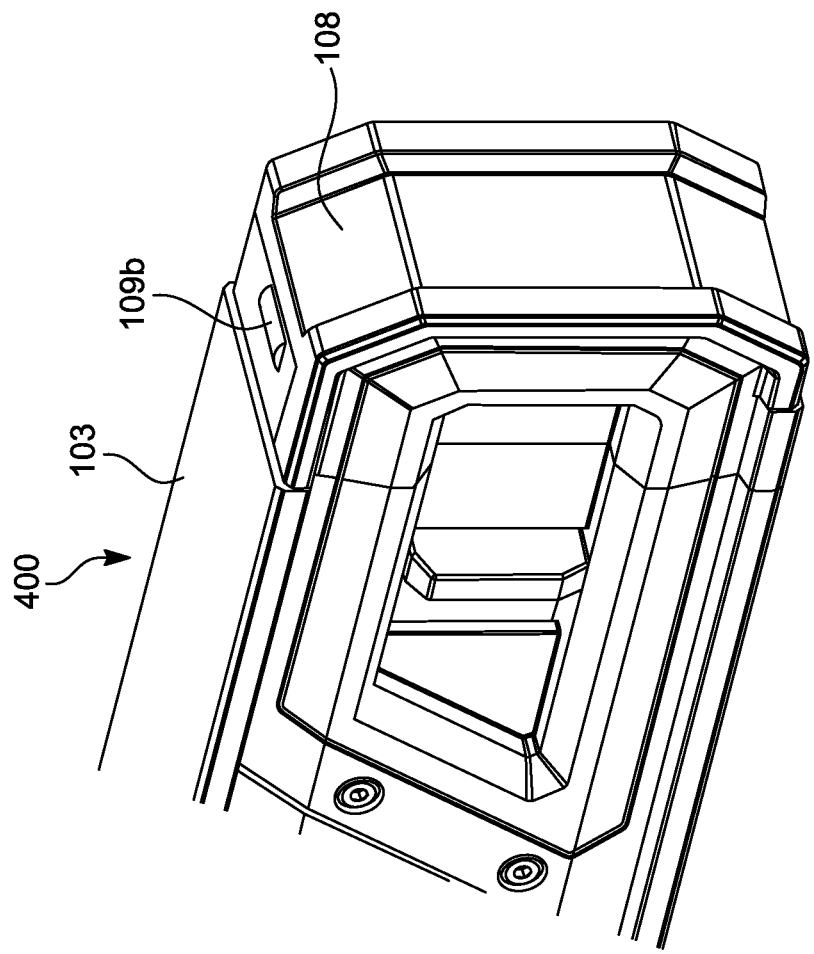
FIG. 4 shows an example endcap of the level apparatus of FIG. 1 in a contracted state, with a semi cylindrical non-coplanar contact member for measuring an orientation of a work surface.

FIG. 4 shows an example endcap of the level apparatus of FIG. 1 in a contracted state, with a semi cylindrical non-coplanar contact member for measuring an orientation of a work surface. FIG. 4 shows an embodiment of present disclosure with a semi cylindrical non-coplanar contact member. Illustration shows a view 400 of an endcap 108 adjacent to body 102 of a contracted level apparatus 100 with a semi cylindrical non-coplanar contact member. FIG. 4 further illustrates the base surface 103, endcap 108, and a semi cylindrical non-coplanar contact member 109b coupled to the endcap 108.

The semi cylindrical non-coplanar contact member 109b is coupled to the endcap 108 in a horizontal configuration. FIG. 4 shows the configuration where the tip or uppermost linear surface of the side of the semi cylindrical shape protrudes away from the endcap 108 and will be resting on a work surface when the base surface 103 of the level apparatus 100 is laid on the work surface which is to be orientation measured. The tip or top side line of the side of the semi cylindrical non-coplanar contact member 109b provides a line of contact with the work surface, where the line of contact is coplanar with the base surface 103. The line of contact with the work surface by the semi cylindrical non-coplanar contact member 109b lies in the same plane as the planar base surface 103. The method used for coupling the semi cylindrical non-coplanar contact member 109b to the endcap 108 is similar to the previously detailed method of coupling of the non-coplanar contact member 109a to the endcap 108.

Figure 5:
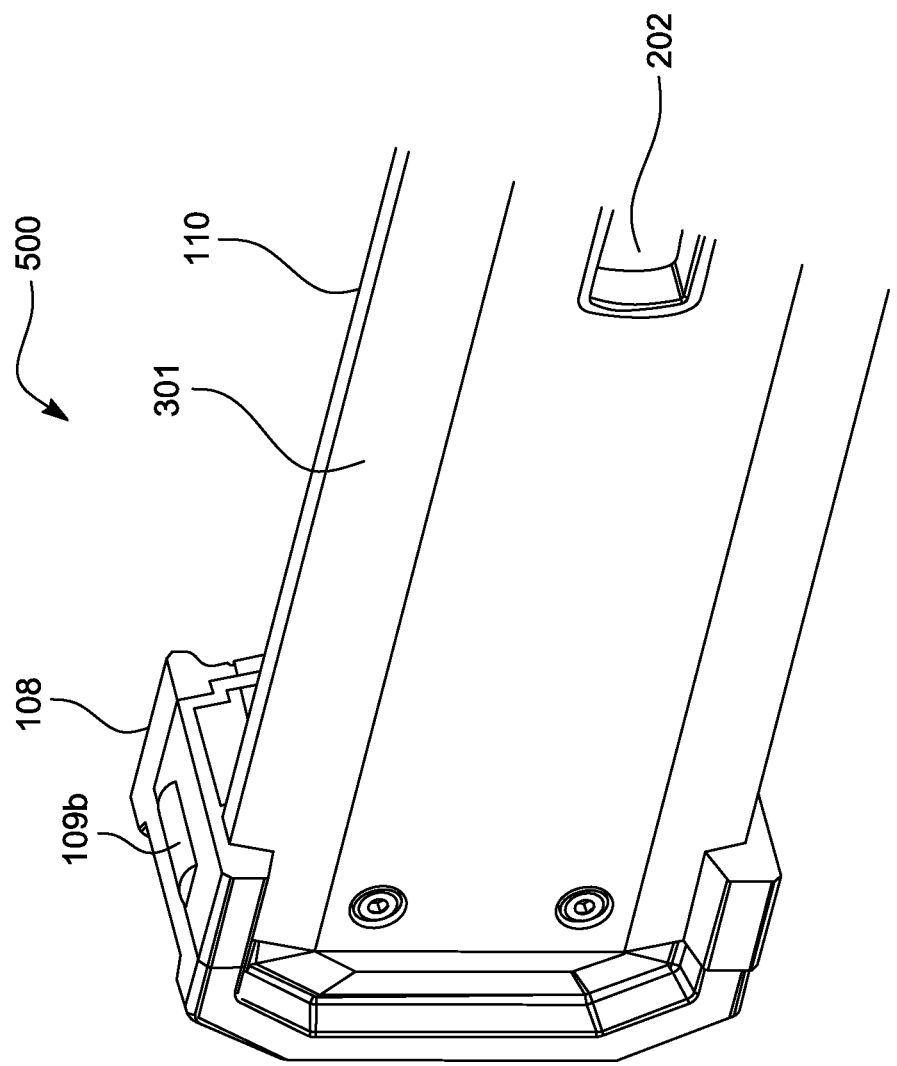
FIG. 5 shows an example endcap of level apparatus of FIG. 1 in an extended state, with a semi cylindrical non-coplanar contact member for measuring orientation of a work surface.

FIG. 5 shows an example endcap of level apparatus of FIG. 1 in an extended state, with a semi cylindrical non-coplanar contact member for measuring orientation of a work surface. Illustration shows a view 500 of the endcap 108 in an extended configuration of level apparatus 100 with a semi cylindrical non-coplanar contact member 109b coupled to the endcap 108. FIG. 5 further shows the slider 110, a back view of the slider 301, endcap 108, and the semi cylindrical non-coplanar contact member 109b.

In order to measure orientation of a work surface that is longer than a contracted length of the level apparatus 100, the slider 110 is slid and the coupled endcap 108 is extended away from the body 102 (not shown) lengthening the level apparatus 100. A base surface 103 (not shown) of the level apparatus 100 is placed on the work surface (not shown) and the semi cylindrical non-coplanar contact member 109b is also placed on, and makes contact with, the work surface, where the tip or top side line of the semi cylinder makes contact with the work surface in a line, and where the contact line is coplanar with the base surface 103 (not shown).

Figure 6:
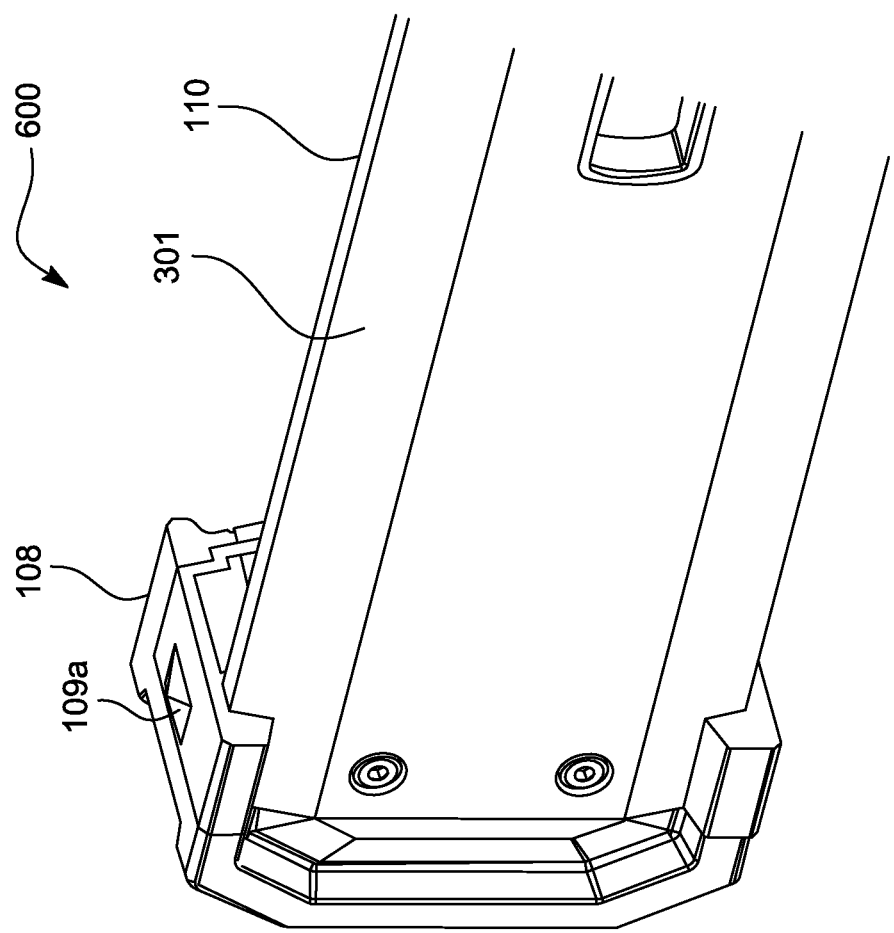
FIG. 6 shows an example of an endcap of a level apparatus in an extended state with a pyramid non-coplanar contact member for measuring orientation of a work surface.

FIG. 6 shows an example of an endcap of a level apparatus in an extended state with a pyramid non-coplanar contact member for measuring orientation of a work surface. FIG. 6 shows an additional embodiment of the present disclosure with a pyramid non-coplanar contact member. Illustration shows a view 600 of the endcap 108 in an extended configuration of level apparatus 100 with a pyramid non-coplanar contact member 109e coupled to the endcap 108. FIG. 6 further shows the slider 110, a back view of the slider 301, endcap 108, and the pyramid non-coplanar contact member 109e.

In order to measure orientation of a work surface that is longer than a contracted length of the level apparatus 100, the slider 110 is slid and the coupled endcap 108 is extended away from the body 102 (not shown) lengthening the level apparatus 100. A base surface 103 (not shown) of the level apparatus 100 is placed on the work surface (not shown) and the pyramid non-coplanar contact member 109e is also placed on, and makes contact with, the work surface, where the tip (or otherwise identified as an apex) of the pyramid makes contact with the work surface, and where the tip is coplanar with the base surface 103 (not shown), that is the tip or apex of the pyramid non-coplanar contact member 109e when in contact with the work surface lies in the same plane as the planar base surface 103. Furthermore, the method used for coupling the pyramid non-coplanar contact member 109e to the endcap 108 is similar to the previously detailed method of coupling of the non-coplanar contact member 109a to the endcap 108.

Figure 7:
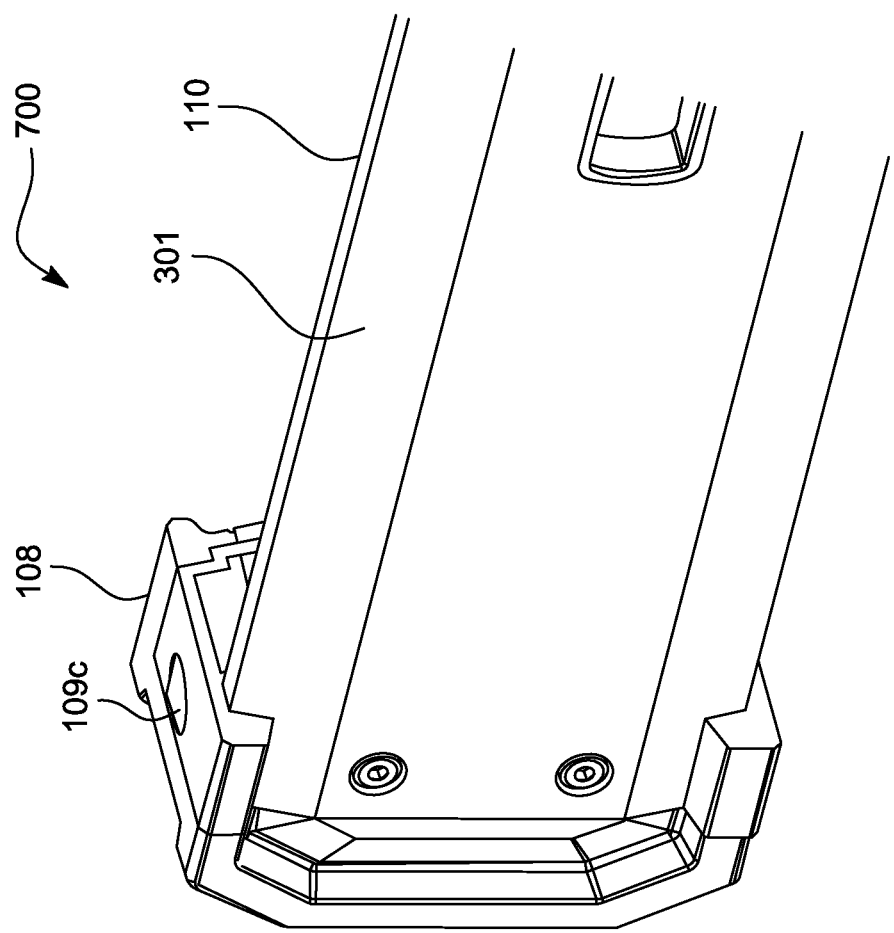
FIG. 7 shows an example of an endcap of a level apparatus in an extended state with a conical non-coplanar contact member for measuring orientation of a work surface.

FIG. 7 shows an example of an endcap of a level apparatus in an extended state with a conical non-coplanar contact member for measuring orientation of a work surface. FIG. 7 shows yet another embodiment of present disclosure with a conical non-coplanar contact member. Illustration shows a view 700 of the endcap 108 in an extended configuration of level apparatus 100 with a conical non-coplanar contact member 109c coupled to the endcap 108. FIG. 7 further shows the slider 110, a back view of the slider 301, endcap 108, and the conical non-coplanar contact member 109c.

In order to measure orientation of a work surface that is longer than a contracted length of the level apparatus 100, the slider 110 is slid and the coupled endcap 108 is extended away from the body 102 (not shown) lengthening the level apparatus 100. A base surface 103 (not shown) of the level apparatus 100 is placed on the work surface (not shown) and the conical non-coplanar contact member 109c is also placed on, and makes contact with, the work surface, where the tip (otherwise identified as an apex or a vertex) of the conical non-coplanar contact member 109c makes contact with the work surface, and where the tip is coplanar with the base surface 103 (not shown), that is the tip of the conical non-coplanar contact member 109c when in contact with the work surface lies in the same plane as the planar base surface 103. Furthermore, the method used for coupling the conical non-coplanar contact member 109c to the endcap 108 is similar to the previously detailed method of coupling of the non-coplanar contact member 109a to the endcap 108.

Figure 8:
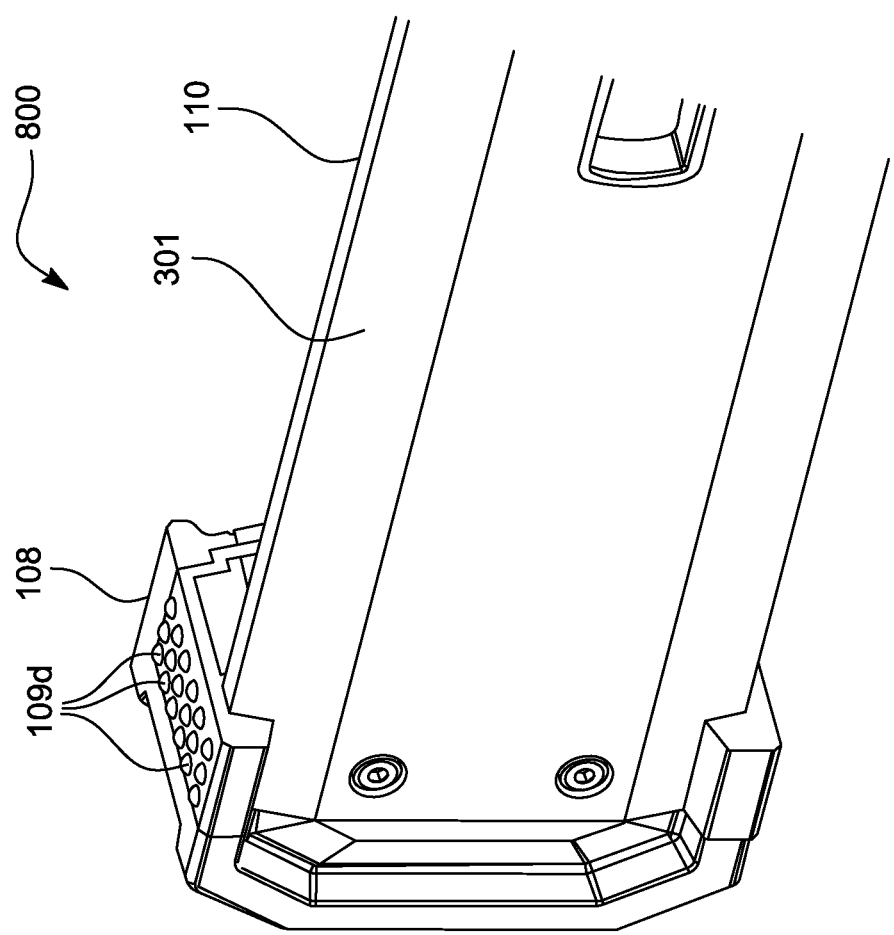
FIG. 8 shows an example of an endcap of a level apparatus in an extended state with a plurality of semi sphere non-coplanar contact members for measuring orientation of a work surface.

FIG. 8 shows an example of an endcap of a level apparatus in an extended state with a plurality of semi sphere non-coplanar contact members for measuring orientation of a work surface. FIG. 8 shows a further embodiment of the present disclosure with a semi spherical non-coplanar contact member. Illustration shows a view 800 of the endcap 108 in an extended configuration of level apparatus 100 with semi sphere non-coplanar contact members 109d. FIG. 8 further shows the slider 110, a back view of the slider 301, endcap 108, and the semi sphere non-coplanar contact members 109d coupled to the endcap 108.

In order to measure orientation of a work surface that is longer than a contracted length of the level apparatus 100, the slider 110 is slid and the coupled endcap 108 is extended away from the body 102 (not shown) lengthening the level apparatus 100. A base surface 103 (not shown) of the level apparatus 100 is placed on the work surface (not shown) and the semi sphere non-coplanar contact members 109d are also placed on, and makes contact with, the work surface, where the tips or tops of the semi spheres (or otherwise identified as apex of each semi sphere) make contact with the work surface, and where the tip or top of each semi sphere is coplanar with the base surface 103 (not shown), that is the tip of the semi sphere non-coplanar contact members 109d when in contact with the work surface lies in the same plane as the planar base surface 103. Furthermore, the method used for coupling the semi sphere non-coplanar contact members 109d to the endcap 108 is similar to the previously detailed method of coupling of the non-coplanar contact member 109a to the endcap 108.

In various embodiments the common feature is extendibility of the level apparatus 100, and differing features include the variation in the non-coplanar contact member 109a of the level apparatus 100 coupled to the endcap 108, which is coupled to the slider 110. Even though the presented non-coplanar contact member 109a options including a semi cylindrical non-coplanar contact member 109b horizontally coupled to the endcap 108, a pyramid non-coplanar contact member 109e coupled to the endcap 108, a conical non-coplanar contact member 109c coupled to the endcap 108, and a semi sphere non-coplanar contact member 109d coupled to the endcap 108; are all non-coplanar, yet the tip or top of the various embodiment contact members either form an apex contact point or a line contact, with the contact apex or contact line coplanar with the base surface 103 of the level apparatus 100.

Changes can be made to the claimed invention in light of the above detailed description. While the above description details certain embodiments of the invention and describes the best mode contemplated, no matter how detailed the above appears in text, the claimed invention can be practiced in many ways. Details of the apparatus, system or the assembly may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim restrictions. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to system that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms, for example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A level apparatus, comprising:
a body with a slide channel;
a slider coupled with the body via the slide channel to slide parallel with respect to the body to extend a length of the level apparatus;
a planar base surface on a side of the body to allow the level apparatus to rest on a work surface the orientation of which is to be measured;
an endcap coupled with the slider; and
a non-coplanar contact member coupled with the endcap to rest on the work surface, wherein the non-coplanar contact member is not coplanar with respect to the planar base surface, while a tip of the non-coplanar contact member is coplanar with the planar base surface.

2. The level apparatus of claim 1, wherein the endcap extends away from the body increasing a length of the level apparatus; and
with the endcap not extended away from the body the level apparatus is in a contracted configuration.

3. The level apparatus of claim 1, further comprising an orientation measuring device.

4. The level apparatus of claim 3, wherein the orientation measuring device comprises a bubble vial, a circular vial, an electronic orientation measuring device, a piezoelectric based orientation measuring device, or a combination thereof.

5. The level apparatus of claim 1, wherein the non-coplanar contact member comprises a semi sphere.

6. The level apparatus of claim 5, wherein the non-coplanar contact member comprises a plurality of semi spheres coupled to the endcap about equally distanced from each other forming a matrix.

7. The level apparatus of claim 6, wherein the tips of the non-coplanar semi spheres are coplanar with the planar base surface.

8. An orientation measuring assembly, comprising:
an I-beam shaped body, wherein the I-beam shaped body comprise a web and an upper flange comprising a planar base surface of the body to rest on a work surface the orientation of which is to be measured, wherein the body further comprise a slide channel;
a slider coupled with the body via the slide channel to slide parallel with respect to the body to extend a length of the level apparatus;
an endcap coupled to a free end of the slider; and
a non-coplanar contact member at the endcap of the slider to rest on the work surface, wherein the non-coplanar contact member is not coplanar with respect to the planar base surface, while a tip of the non-coplanar contact member is coplanar with the planar base surface.

9. The orientation measuring assembly of claim 8, further comprising an orientation measuring device.

10. The orientation measuring assembly of claim 9, wherein the orientation measuring device comprises a bubble vial, a circular vial, an electronic orientation measuring device, a piezoelectric based orientation measuring device, or a combination thereof.

11. The orientation measuring assembly of claim 10, wherein the non-coplanar contact member comprises a semi sphere.

12. The orientation measuring assembly of claim 11, wherein the non-coplanar contact member comprise a plurality of semi spheres coupled to the endcap about equally distanced from each other forming a matrix.

13. The orientation measuring assembly of claim 12, wherein the tips of the non-coplanar semi spheres are coplanar with the planar base surface.

14. The orientation measuring assembly of claim 8, wherein the endcap extends away from the body increasing a length of the orientation measuring assembly; and
with the endcap not extended away from the body the orientation measuring assembly is in a contracted configuration.

15. A method for using a level apparatus, comprising:
sliding a slider coupled to an endcap through a slide channel of a body of the level apparatus;
extending a length of the level apparatus to accommodate a length of a work surface which is to be orientation measured;
resting a base surface of the body on the work surface;
resting a non-coplanar contact member coupled to the endcap on the work surface, wherein the non-coplanar contact member is not coplanar with respect to the base surface, while a tip of the non-coplanar contact member is coplanar with the base surface; and
making the orientation measurement of the work surface using an orientation measuring device coupled to the body.

16. The method of use of the level device of claim 15, wherein the orientation measuring device comprises a bubble vial, a circular vial, an electronic orientation measuring device, a piezoelectric based orientation measuring device, or a combination thereof.

17. The method of use of the level device of claim 15, wherein the non-coplanar contact member comprises a semi sphere coupled to the endcap.

18. The method of use of the level device of claim 17, wherein a tip of the non-coplanar semi sphere is coplanar with the base surface.

19. The method of use of the level device of claim 17, wherein the non-coplanar contact member comprises a plurality of semi spheres coupled to the endcap.

20. The method of use of the level device of claim 19, wherein the plurality of semi spheres coupled to the endcap are spaced about equal distance from each other forming a matrix pattern; and
wherein tips of the non-coplanar semi spheres are coplanar with the planar base surface.

* * * * *